INVENTOR.
WILLIAM E. RICE

Feb. 7, 1961 W. E. RICE 2,970,848
SWAY CONTROL SUSPENSION FOR VEHICLES
Filed Dec. 27, 1956 3 Sheets-Sheet 3

INVENTOR.
WILLIAM E. RICE
BY
ATTYS.

United States Patent Office 2,970,848
Patented Feb. 7, 1961

2,970,848

SWAY CONTROL SUSPENSION FOR VEHICLES

William E. Rice, Buchanan, Mich., assignor to Clark Equipment Company, a corporation of Michigan Filed Dec. 27, 1956, Ser. No. 630,991

5 Claims. (Cl. 280—124)

This invention relates generally to improvements in vehicle suspension systems, and particularly concerns improvements in control linkages used in connecting transverse axles to vehicle frames.

In axle suspension systems, particularly those employing pneumatic cushion or spring means, it is essential that provision be made for resisting or dampening horizontal, vertical, torque, and twisting movements of the axles in order to relieve the supporting air cushions from the impact of such loads. In the suspension system of the present invention, I provide an improved sway bar means having a torsion bar capable of performing the usual function of sway bars in resisting upward and downward vertical motion of one end of the axle with respect to the other, thus to control vehicle sway or roll. My improved sway bar means also includes means for performing the function of the usual radius rods normally employed for connecting and positioning the axle with respect to the vehicle frame. The sway bar means or assembly, therefore, also resists brake torque, driving torque, and lateral forces on the axle. Means are included in my improved suspension system to further permit limited lateral movement of an axle associated therewith so that controlled steering action of a vehicle equipped with a tandem axle suspension as, for example, a truck trailer or the like, may take place in turning corners and like operations. This latter function is accomplished by and large through the provision of a resilient support or mounting means employed in the sway bar structure which affords limited movement of an associated axle along its longitudinal axis. The present invention has particular utility and adaptation for tandem mounted axle suspension systems, where limited steering action is particularly required, although its adaptation and use in single axle suspensions is also fully contemplated.

The main object of the present invention is to provide a new and improved suspension system for connecting axles to the framing of a vehicle.

Another object of this invention is to provide an interconnecting linkage structure and an improved sway bar means for use in an axle suspension system as aforesaid.

An adidtional object of this invention is to provide a new and improved axle suspension structure in which air cushion or spring means are embodied, the suspension system including an improved sway bar structure for dampening horizontal, axial, vertical, and twisting movement of the axle, thus to protect the air spring means and the vehicle from the impact of forces produced by such movements and to control the vehicle from excessive lateral sway.

Still another object of this invention is to provide a new and improved air suspension system for vehicles particularly adapted for tandem mounted axles, which permits limited steering action of the axles when rounding a corner, or like vehicle maneuver.

Another important object of this invention is to provide a new and improved air suspension system for vehicle axles having improved features of operation and funtcion in supporting of the axles and demonstrating improved features of structural simplicity.

The above and further objects, features, and advantages of this invention pertaining to its novelty and aspects of construction and combination of parts will appear from time to time in the following detailed description of suitable embodiments of the invention, as shown particularly in the accompanying drawings.

Figure 1:
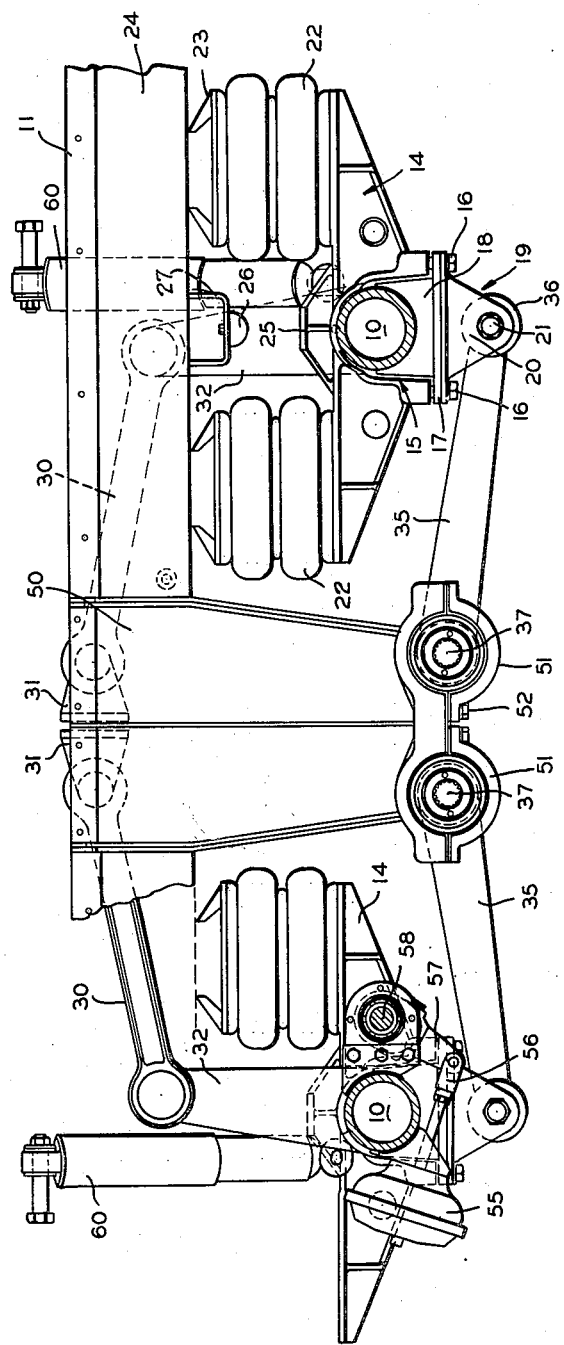
Figure 1 is a side-elevational view showing the improved suspension system of this invention in conjunction with a tandem axle mounting.
Figure 2:
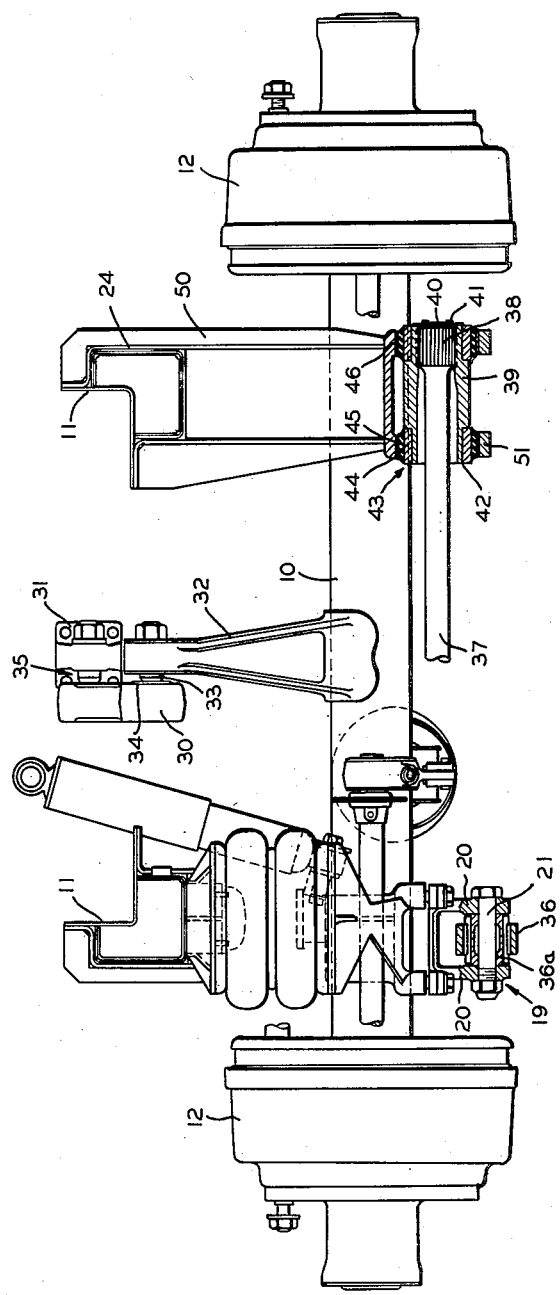
Figure 2 is a front-elevational view with parts therein shown in cross section of the structure set forth in Figure 1.
Figure 3:
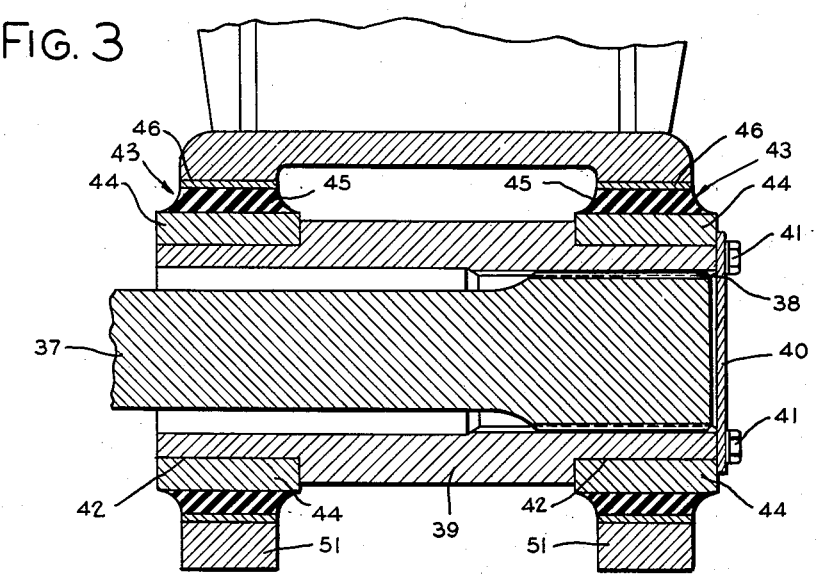
Figure 3 is an enlarged partial view in cross section showing the particulars of the improved coupling means embodied in the sway bar linkage of the structure shown in Figures 1 and 2.

Turning now to the features of the tandem axle suspension system shown in Figures 1 through 3 of the drawings, it will be recognized that the assembly therein shown represents a type of suspension system in which the vehicle frame is cushioned on air springs and supported by a pair of tandem related axles. Such a structure finds particular utility in heavy-duty highway trailer equipment of the dual-axle type, although such is by no means necessarily restricted to that particular application. It will be recognized also that while the embodiment shown in these figures includes a pneumatic spring system, other types of cushioning means, such as coil or leaf metal springs, may be employed.

In Figure 1 the tandem related axles are indicated at numeral 10, such being spaced parallel transversely beneath longitudinal underframe members 11—11 associated with the vehicle body. At the opposite ends of each axle 10, one of which is shown in Figure 2, are hub assemblies 12 which include the brake shoes and provisions for attaching the wheels to the axles. Since the construction and internal arrangement of the hub assemblies 12 is conventional, a detailed description thereof will not be entered into herein.

Located axially inwardly of the hub assemblies 12—12 and transversely of the longitudinal axis of the axles 10 are bracket means 14—14. It will be noted that each axle 10 carries two of such bracket means 14 and that the same are aligned in parallel spaced relation. Each bracket bears a central yoke portion 15 adapted to embrace the upper portion of the associated axle 10. The outer or lower ends of the yoke 15 are suitably threaded for the reception of stud bolts 16—16 which pass through a flange portion 17 of a pillow block 18 suitably formed to embrace the lower side of the axle 10. When stud bolts 16 are tightened into the arms of the yoke member 15, the bracket means 14 associated with the latter are rigidly fixed above the axle. A triangular shaped bracket assembly 19 depends from platform 17, the same being held with pillow block 18 to the underside of the yoke 15 upon the application of the stud bolts 16, as described. In this regard, it will be noted from Figure 2 that the bracket assembly 19 includes two laterally spaced, triangular shaped ear portions 20—20 receptive of a pivot pin 21 therebetween, the purpose of which will be amplified presently hereinafter.

On the upper side of each bracket 14, and adjacent the outer ends thereof, are supported two pneumatic bellows 22, which are received at their upper ends in disclike housings 23, communicating with the interior of an elongated air chamber 24 constructed substantially as a box of L-shaped cross section, as best viewed in Figure 2. Each air chamber is closed off at its ends for receiving pressurized air to supply the bellows 22—22. The air chambers 24 in turn are rigidly secured to the longitudinal frame members 11 of the vehicle undercarriage or frame. From Figure 2 it will be seen that the frame members 11 substantially nest within one upper corner of the air chamber members 24.

The four pairs of pneumatic bellows, thus provided, serve to support the main frame members 11 of the vehicle, the latter being suitably interconnected by cross bracing and other frame members (not shown) in a conventional manner to carry a vehicle body, such as the storage van of a trailer or the like. Intermediate the two bellows 22—22 on each of the bracket members 14 is a raised platform portion 25, which is adapted to engage a limit shock 26, depending from the under side of the overlying air chamber member 24. The shocks 26 are formed as semi-spherical rubber buttons, each suported by suitable bracket means 27, depending from an overlying air chamber 24.

In order to maintain the air springs in proper alignment, a pair of conventional radius rods 30—30 are provided, one related to each axle 10. Such radius rods are pivotally joined at one end to bracket members 31—31 mounted on the main frame of the vehicle substantially centrally between the two axles 10—10. The opposite end of each radius rod 30 is pivotally joined to the upper end of one of two crank arms 32, one extending upwardly from each of the axles 10—10, substantially as shown in Figure 2 of the drawings. In order to accomplish the interconnection of the crank arms 32 and the radius rods 30, pivot pin members 33 are employed. Each pin member 33 is housed by a resilient bushing 34 carried in the adjacent end of the related radius rod 30. A similar bushing and pivot pin connection is used between the brackets 31 and radius rods 30, as indicated generally by numeral 35 in Figure 2. The crank arms 32 are located substantially midway between the hub assemblies 12—12 on the axle pin; each crank arm 32 being rigidly affixed at one end to an axle 10, as by welding connections or the like.

To provide a parallelogram-type linkage support for each axle 10, a pair of radius-rod torque arms 35—35 is employed therewith. In particular, each torque arm is pivoted at one end on one of the pivot pins 21 associated with the previously described bracket assemblies 19 depending beneath the brackets 14 which support the air cushions. Each torque arm 35 has a hub portion 36 at its one end receptive of a resilient cushion bushing 36a, as best seen in Figure 2. This bushing 36a in turn receives the pivot pin 21 therethrough so that the hub portion 36 is disposed between the laterally spaced depending ear members 20—20 of the bracket assembly 19. Thus, the torque arms 35 are pivotally joined to the bracket assemblies 19. A transverse sway bar or torsion bar 37 interconnects the inner ends of each pair of torque arms 35—35, thus associated with each of the axles 10. This relationship may best be understood by examining Figure 2; it being understood that there are two pairs of arms 35—35 and two torsion or sway bars 37 in the tandem axle suspension system, illustrated in Figures 1 through 3 of the drawings. Each sway bar 37 is splined adjacent its ends, as at 38; each of such splines 38 interfittingly engaging a corresponding splined socket formed in the internal walls of a cylindrical hub portion 39 formed at the inner end of each torque arm 35. This relation may best be seen in the enlarged Figure 3.

With the splined connection thus provided, it will be understood that the torque arms 35 are fixed against rotation relative to the associated sway bar 37, and vice versa. A cap or retainer plate 40 covers over the outer end of each hub portion 39; the same being attached to such hub portion by cap screws 41—41. Each hub portion 39 is formed adjacent its outer ends with inwardly set annular shoulder portions 42, each of which receives an annular bushing assembly 43 comprising an annular metal inner ring 44 adapted to be pressed fitted onto a related shoulder 42. A resilient rubber cushion ring 45 is bonded to and surrounds the inner ring 44 and in turn is bonded to and encased by an outer metal ring 46. Since the inner rings 44 of the bushing assemblies 43 are press fitted onto the ends of each torque arm hub portion 39, there is no rotation between the bushing assemblies 43 and the hubs 39 of the torque arms.

To support the torque arms, torque rods, and bushing assemblies, which comprise my improved sway bar means, a pair of laterally spaced support brackets 50 depend one each from each of the rail frames 11; such brackets 50 being located substantially centrally between the axles 10—10 and opposite the central brackets 31—31 associated with the radius rods 30. The brackets 50 each carry a pair of split rings 51—51 which encase the outer metal rings 46 of the two bushing assemblies 43 on the hub 39 of the torque arms. Such split rings 51 are fastened together by cap screw means 52, or the like devices, and serve to clamp the bushing assemblies 43 therebetween. In this manner, the inner ends of the torque arms 35 are supported in parallelism with the inner ends of the radius rods 30 and are permitted to move relative to the rings 51 and the depending support brackets 50 associated therewith by suitable deformation of the cushion rings 45. Thus torque transmission to bar 37 is cushioned somewhat by rings 45.

Since the torque arms 35 and bars 37 are interconnected by the splined junction means, as previously described, it is obvious that vertical movement of either torque arm 35, independently of the other torque arm related therewith, will cause torsional loading of the rod or sway bar 37. Thus, the sway bar arrangement provided by the combination of the arms 35 and rod 37 performs the usual function of a sway bar for resisting upward and downward motion of one end of the axle with respect to the other. It will be noted, additionally, that the arms 35, which form a portion of the sway bar arrangement, take the place of the usual radius rods conventionally employed for positioning the axle and resisting drive torque, brake torque, and lateral forces on the suspension system. Such arms 35, therefore, control the vertical springing movement of the axle and resist torque and lateral stresses resulting from pulling, braking, and like operations of the vehicle.

More importantly, the resilient rubber rings or cushion portion 45 in the bushing assemblies 43, intermediate the hubs 39 on torque arms 35 and the depending support brackets 50, also deform sufficiently endwise to permit limited lateral motion of the sway bar assemblies and thus the related axles. This feature permits limited steering action of the axles, as when a trailer, or a like vehicle, equipped with such a tandem suspension turns a corner. Thus, in effect, while the torque arms 35 and sway bars 37 provide the usual functions of a sway bar assembly, they additionally are coupled by means for permitting slight lateral activity of the sway bar assembly and desired steering activity of the related axles.

In addition to the foregoing linkage means associated with the suspension system in this invention, I also include required air brake operating means, each comprising an air cylinder 55, linkage 56 operated thereby and a crank arm 57 joined to a cross disposed actuating shaft 58. Shafts 58 in turn act on suitable cam arrangements within the hub assemblies 12 to actuate brake shoes contained therein, all according to conventional practice. Shock absorber assemblies 60—60 are also included as required to complete the assembly, these functioning according to known practice.

Figure 4:
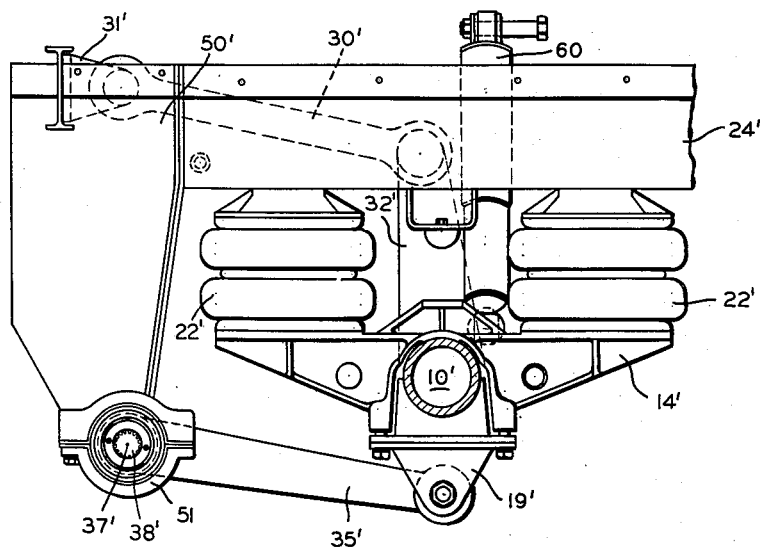
Figure 4 is a side-elevational view, similar to Figure 1, showing a modified embodiment of my invention for suspending a single axle.

While the foregoing description concerns an embodiment in which the suspension of a pair of tandem related axles is carried out, I have illustrated in Figure 4 a modification thereof in which the suspension of a single axle is undertaken according to the concepts of this invention. It will be recognized that the suspension system of Figure 4 comprises substantially one half of that illustrated in Figures 1 through 3 of the drawings, with the axle 10' therein carrying suitable brackets 14'; each of which supports a pair of pneumatic bellows 22' communicating with an overdisposed air chamber 24'. The axle 10' further carries a central crank arm 32' pivotally joined at its upper end to one end of a radius rod 30'. Brackets 31' are used to pivotally support the inner ends of the radius rods 30', all in the manner previously described for the assembly of Figure 1. The sway bar torque arms 35' are pivotally joined at one end to the axle 10' by bracket assemblies 19' in the same manner as previously related, with such torque arms being fixed to a cross connecting torque rod or sway bar 37' by splined connection means 38' and mating splined socket means in the inner hub ends of the torque arms. It will be recognized that a vertical depending support bracket 50' is provided to carry bar 37' similar to bracket 50 in Figure 1, except that but a single set of split rings 51 is provided on each bracket 50' since only one sway bar assembly is related therewith.

The manner of operation and function of the modified single axle suspension system of Figure 4 is as previously described in the discussion of the tandem axle suspension assembly of Figure 1.

From the foregoing, it is believed that those familiar with the art will recognize and appreciate the novel concepts and features of the improved suspension system of this invention. In particular, it is submitted that the controlled lateral activity permitted by the resilient connection between the torque arms 35 and the sway bar 37, to permit limited steering action of a related axle, coupled with the dual function of the torque arms 35, as radius rods and means for applying torsion to the torque rod 37 in the sway bar assembly marks the present assembly as an improved advancement over previous systems of this type. Further while I have herein shown and described the features and aspects of my improved invention in association with a preferred tandem axle system and a modified single axle suspension system, it will be recognized that numerous changes, modifications, and substitutions of equivalents may be made therein without necessarily departing from the spirit and scope of my invention. For example, while the system is herein related to a spring system employing pneumatic means, it is obvious that coil springs, leaf springs, or other types of shock-absorbing mechanisms may be employed in their stead without necessarily departing from the features of my invention. As a consequence, it is not my intention to be limited to the particular form of my invention herein shown and described, except as may appear in the following appended claims.

I claim:

1. In a vehicle having a main frame and a pair of tandem related axles disposed transversely therebeneath, a suspension system comprising, a pair of bracket means carried adjacent opposite ends of each axle, pairs of pneumatic bellows forming resilient air spring members mounted on each of said bracket means and extending between the same and the main frame of the vehicle, a single crank means carried intermediate the ends of each axle and extending above the said bellows, radius rod means pivotally joined to and extending between the upper end of each crank means and the vehicle's main frame, pairs of torque arms associated with each axle and pivotally connected adjacent the ends of the latter, depending bracket members disposed intermediate the two axles adjacent opposite sides of the vehicle's main frame, spaced pairs of bushing means carried at the lower ends of each of said bracket members, said bushing means supporting the other ends of said torque arms, a pair of torsion bar means extending between said bracket members coaxially of said bushing means and parallel to said axle, and means interconnecting the ends of each of said torsion bar means with a pair of said torque arm means, such interconnection of the torsion bar and torque arm means providing torsional loading of the torsion bars by cranking action of said torque arm means which act as radius rods to position said axle whereby a system is provided to resist vertical, twisting, longitudinal, and horizontal movements of the axles relative to the main frame.

2. The combination as set forth in claim 1 including resilient annular ring portions in each of said bushing means capable of limited deformation to permit corresponding limitied lateral motion of each torsion bar and its related axle thus to provide limited steering action of the axles.

3. In a vehicle having a frame and a pair of tandem related axles disposed transversely therebeneath, a suspension mechanism comprising, pairs of bracket means carried adjacent opposite ends of each axle, vertically disposed spring means mounted on each of said bracket means and extending between the bracket means and the frame, a pair of crank members rigidly connected centrally of the respective axles and extending vertically upward to a level above the upper margins of the said spring means, a pair of radius rods extending between the upper ends of the said crank members respectively and the frame, resilient connections being provided at both ends of each radius rod joining it to its crank member and to the frame, depending bracket members disposed intermediate the two axles adjacent opposite sides of the frame and extending downwardly, and two U-shaped sway bar and radius rod members each comprising a torsion rod bight portion and radius rod arm portions, the said torsion rod portions being mounted on the said depending bracket members by resilient connections and the said arm portions being joined by resilient connections to the respective axles adjacent the ends thereof.

4. A suspension mechanism for a vehicle comprising a main frame, a pair of transversely disposed axles located beneath the said main frame in longitudinal tandem relation, pairs of bracket means carried adjacent opposite ends of each axle, pneumatic springs located on each of said bracket means and extending between the bracket means and the said main frame, a pair of crank arm members rigidly connected centrally of the respective axles and extending vertically upward above the level of the upper margins of the said pneumatic springs, a pair of upper radius rods connected respectively to the upper ends of the said crank arm members by means of resilient connections, the upper radius rod connected to the rear axle crank arm extending forwardly and the upper radius rod connected to the front axle crank arm extending rearwardly, the forward and rearward ends of the rear axle and front axle upper radius rods respectively being connected adjacent each other to the said main frame by resilient connections, depending bracket members disposed intermediate the two axles adjacent opposite sides of the said main frame and extending downwardly, two U-shaped combined sway bar and radius rod members each comprising a torsion rod bight portion and radius rod arm portions, the said torsion rod portions being mounted on the said depending bracket members by resilient connections and the said arm portions being joined by resilient connections to the respective axles adjacent the ends thereof, and the two radius rod arm portions of the U-shaped combined sway bar and radius rod member for one axle being normally parallel to the said upper radius rod for the same axle.

5. A suspension mechanism for a vehicle comprising a main frame, reservoir means rigidly connected to and located immediately beneath the said main frame, a pair of transversely disposed axles located beneath the said main frame and reservoir means in longitudinal tandem relation, four brackets with horizontally disposed upper surfaces secured respectively adjacent the four ends of the pair of axles, eight pneumatic springs located two on each of the said brackets and extending between the said upper surfaces of the respective brackets and the said reservoir means for supporting the said main frame, a pair of crank arm members rigidly connected centrally of the respective axles and extending vertically upward above the level of the upper margins of the said pneumatic springs, a pair of upper radius rods connected respectively to the upper ends of the said crank arm members by means of resilient connections, the upper radius rod connected to the rear axle crank arm extending forwardly and the upper radius rod connected to the front axle crank arm extending rearwardly, the forward and rearward ends of the rear axle and the front axle upper radius rods respectively being connected adjacent each other to the said main frame by resilient connections, two depending bracket members disposed intermediate the two axles adjacent opposite sides respectively of the said main frame and extending downwardly, two U-shaped combined sway bar and radius rod members each comprising a torsion rod bight portion and two radius rod arm portions, the said torsion rod portions being mounted on the said depending bracket members by resilient connections and the said arm portions being joined by resilient connections to the respective axles adjacent the ends thereof, the two radius rod arm portions of the U-shaped combined sway bar and radius rod member for one axle being substantially parallel to the said upper radius rod for the same axle, four brackets equipped with resilient bumper means depending from the said reservoir means respectively between each pair of pneumatic springs for limiting upward movement of the respective brackets, and four shock absorbers connected respectively between the said brackets and the said main frame.

References Cited in the file of this patent

UNITED STATES PATENTS

| | | |
|---|---|---|
| 2,078,521 | Alden | Apr. 27, 1937 |
| 2,096,530 | Alden | Oct. 19, 1937 |
| 2,208,538 | Brown | July 16, 1940 |
| 2,691,420 | Foy | Oct. 12, 1954 |
| 2,754,111 | Norrie | July 10, 1956 |
| 2,784,980 | Norrie | Mar. 12, 1957 |
| 2,790,634 | Fawick | Apr. 30, 1957 |
| 2,865,649 | Chalmers | Dec. 23, 1958 |